Patented Aug. 9, 1938

2,126,268

UNITED STATES PATENT OFFICE 2,126,268

PRESERVATION OF LATEX

John McGavack, Leonia, N. J., assignor to United States Rubber Products, Inc., New York, N. Y., a corporation of Delaware No Drawing. Application April 21, 1936,
Serial No. 75,625

6 Claims. (Cl. 18—50)

This invention relates to improvements in methods of preserving latex and the products thereof.

It is common practice to preserve latex today with from about 1 to 1.25% ammonia. From theoretical considerations, the most satisfactory combination for latex preservation should consist of sufficient basic material to render the latex alkaline and thereby give it mechanical stability, in conjunction with sufficient germicide to prevent bacterial growth and the consequent development of acid in the latex and the resulting coagulation of the rubber therein. It seems unreasonable to employ ammonia, as is now the common practice, to exercise both these functions, for, while ammonia is a satisfactory alkali, its germicidal properties are so feeble that it must be used in concentrations greatly in excess of those necessary to obtain a satisfactory alkalinity and mechanical stability in the latex. Ammonia, in amounts approximately 1% and over as now used, is an expensive preservative and it is extremely desirable to decrease the cost of preserving latex as it is now carried out.

This invention relates to the preservation of latex with reduced amounts of ammonia as compared to those now generally used. It has been found that latex may be satisfactorily preserved against coagulation and putrefaction by the addition of smaller amounts of ammonia than are now used if there is also added a small amount of hydroxylamine. The hydroxylamine acts as a germicidal agent to prevent bacteria growth, and the ammonia provides the desired alkalinity in the latex. The ammonia, if desired, may be added in sufficient amounts to somewhat aid the hydroxylamine in preventing bacterial growth in addition to effecting the desired alkalinity in the latex, but in insufficient amounts to produce of itself a complete preservation as in present practice.

According to the present invention ammonia should be present in amounts up to .6% free ammonia, preferably .1 to .6%, and the hydroxylamine should be present in amounts up to .25%, preferably about .025 to .25%. The amounts of ammonia and hydroxylamine added will depend on the length of time it is desired to preserve the latex. When fresh latex on the plantations has to be further processed, as for example concentrated by a chemical or mechanical creaming operation shortly after tapping, the addition of only small amounts of ammonia and hydroxylamine is necessary before concentrating. After concentrating, additional small amounts may be added to the cream for export. In such a case there is a double saving, first with respect to reduced amounts of ammonia necessary to carry the fresh latex through the creaming operation, and secondly with respect to the reduced amounts of ammonia and hydroxylamine necessary for the preservation of the creamed portion by virtue of the separation from the cream in the concentrating operation of a large proportion of the normally putrefiable protein bodies associated with the rubber. With the preservation of fresh latex for export without further processing, larger amounts of ammonia and hydroxylamine are desirable.

It is often desirable in manufacturing operations to reduce the ammonia content of normal or concentrated latices which under present practice are now preserved with ammonia, and in such cases, the ammonia content is often reduced by blowing a large proportion of the ammonia out of the latex with air. According to the present invention, the thus treated latex may be preserved against putrefaction by the addition of hydroxylamine, there of course remaining in the blown latex sufficient ammonia to maintain the desired alkalinity in the latex.

The hydroxylamine may be added to the latex as such, or in the form of a salt such as the hydrochloride or sulphate. When the hydrochloride or sulphate is used, a proportionate amount of the ammonia that is added will be used up in neutralizing the acid part of the compound. If desired, of course, the hydroxylamine hydrochloride or sulphate may itself first be neutralized with ammonia before being added to the latex.

The following examples are included as illustrative of the invention both with respect to the preservation of fresh latex and to the preservation of latex as now used which is exported with 1 to 1.25% ammonia for complete preservation and whose ammonia content has been reduced by blowing.

In the following examples illustrating the preservation of fresh latex, the ammonia was added in the usual manner as a gas or in aqueous solution, and the hydroxylamine was added in the form of a dilute (1% to 10%) aqueous solution of hydroxylamine hydrochloride. In this way, an amount of the added ammonia equivalent to about 25% by weight of the added hydroxylamine hydrochloride was consumed in neutralizing the hydrochloride of the hydroxylamide. In a series of tests in which .1% by weight ammonia was added, the control, which had no added hydroxylamine, partly coagulated in nineteen hours; a sample to which had been added .05% by weight of hydroxylamine hydrochloride in addition to the .1% ammonia did not begin to coagulate until fifty hours, and a sample to which had been added .20% of hydroxylamine hydrochloride in addition to the .1% ammonia did not begin to putrefy until about eight days.

In another series of tests in which .25% by weight of ammonia was added, the control, which had no added hydroxylamine, showed incipient putrefaction in four days, and the beginning of coagulation in seven days; samples to which had been added, respectively, .05% and .20% by weight of hydroxylamine hydrochloride in addition to the .25% ammonia did not begin to show signs of putrefaction until after twenty days.

In another series of tests in which .50% by weight of ammonia was added, the control, which had no added hydroxylamine, showed incipient putrefaction after twenty days, and samples to which .05% and .20%, respectively, of hydroxylamine hydrochloride had been added in addition to the .50% ammonia showed no signs of putrefaction after twenty days.

In the following examples illustrating the preservation of latex from which the ammonia had been blown off, normal ammonia-preserved latex which had been exported to the United States and which contained the usual 1 to 1.25% of ammonia was used. Its ammonia content was reduced by blowing air over the surface of the latex while constantly stirring the same from five to seven hours, after which the ammonia content was about .1%, an amount low enough to permit fairly rapid putrefaction. The hydroxylamine was added in the form of a 2.5% aqueous solution of hydroxylamine hydrochloride which had been neutralized by the addition of about 85% of the theoretical amount of ammonia for neutralization of the hydrochloride. The thus neutralized solution was just blue to litmus. In one such series, in which the ammonia content had been reduced to .13%, the control, to which no hydroxylamine had been added, began to putrefy in four to five days; a sample to which .012% by weight of hydroxylamine was added (.025% of hydroxylamine hydrochloride) did not develop putrefaction until five to six days; a sample to which .025% of hydroxylamine had been added did not begin to putrefy until thirty-four days. In another series of tests in which the ammonia content was reduced to .12% by weight and ammonia-neutralized hydroxylamine hydrochloride added as above, the control began to show putrefaction after four days, while with various added amounts of hydroxylamine (calculated) of from .025% to .10% by weight showed no putrefaction after ninety-nine days.

It is thus seen that latex may readily be preserved as desired with small amount of ammonia and hydroxylamine.

Having thus described my invention, what I claim and desire to protect by Letters Patent, is:

1. Latex containing free ammonia and hydroxylamine in amounts up to .6% of free ammonia and up to .25% of hydroxylamine.

2. Latext containing a preservative consisting of about .1 to .6% of free ammonia and about .025 to .25% of hydroxylamine.

3. The method of preserving latex which comprises adding to latex small amounts of ammonia and hydroxylamine.

4. The method of preserving latex which comprises adding to latex ammonia and hydroxylamine in amounts up to .6% of ammonia and up to .25% of hydroxylamine.

5. The method of preserving latex which comprises adding to latex about .1 to .6% of ammonia and up to .25% of hydroxylamine.

6. Latex preserved with ammonia and hydroxylamine.

JOHN McGAVACK.